UNITED STATES PATENT OFFICE.

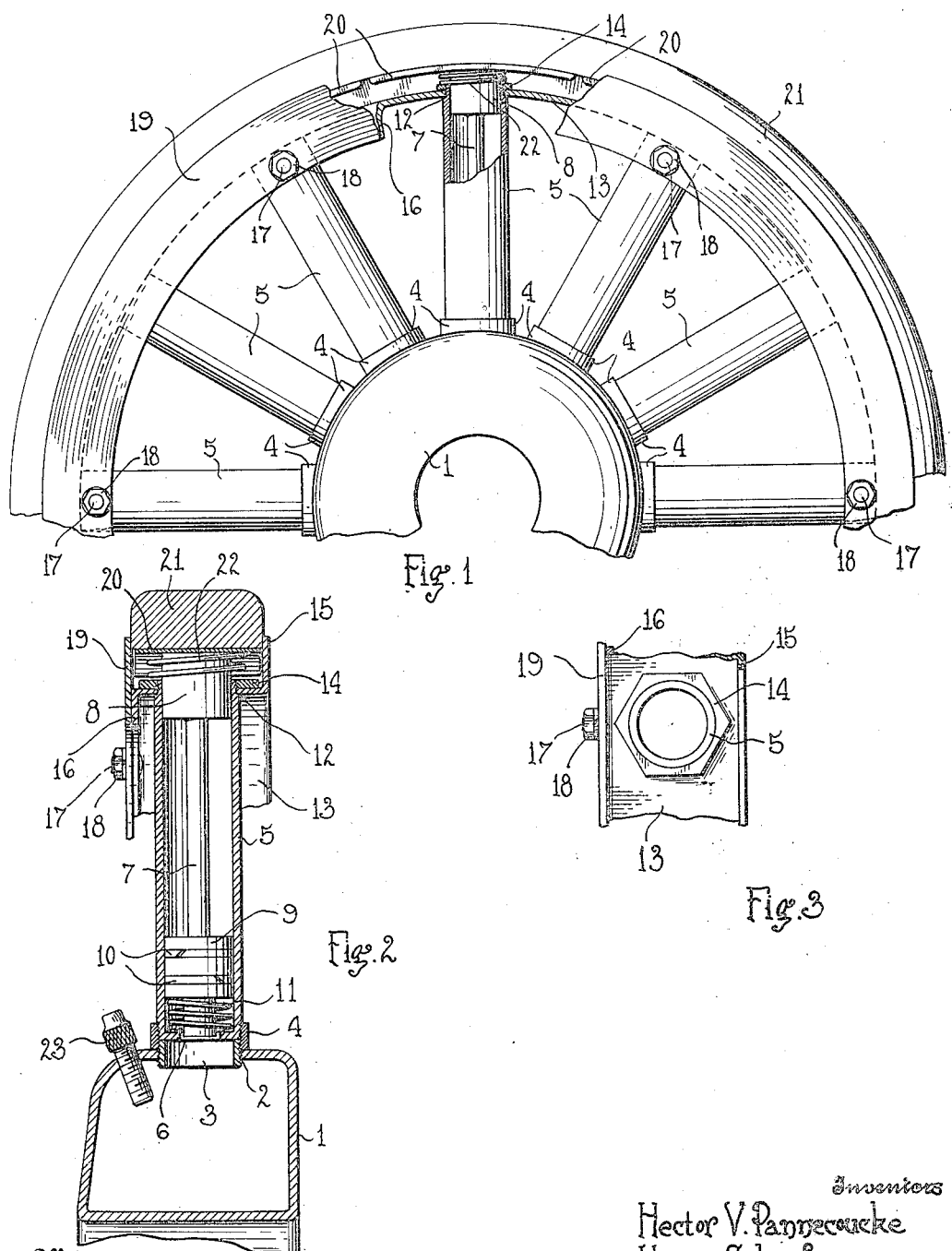

HECTOR V. PANNECOUCKE AND HUGO SCHAEFER, OF DETROIT, MICHIGAN.

WHEEL.

1,153,948.

Specification of Letters Patent. Patented Sept. 21, 1915.

Application filed December 5, 1914. Serial No. 875,575.

*To all whom it may concern:*

Be it known that we, HECTOR V. PANNECOUCKE, a citizen of the United States, and HUGO SCHAEFER, a subject of the Emperor of Germany, residing at Detroit, in the county of Wayne and State of Michigan, have invented certain new and useful Improvements in Wheels, of which the following is a specification, reference being had therein to the accompanying drawings.

This invention relates to vehicle wheels, and the primary object of our invention is to provide a wheel with a novel air and spring cushion tire that obviates the necessity of using an inner pneumatic tube to insure easy movement of a vehicle.

Another object of our invention is to furnish the spokes of a vehicle wheel with simple and effective means for yieldably supporting a tire upon the periphery of the wheel, the construction of the tire being such that it can be easily and quickly removed when repairs are necessary.

A still further object of our invention is to provide a strong and durable vehicle wheel consisting of comparatively few parts that are easy to assemble, inexpensive to manufacture, and highly efficient for various kinds of vehicles.

With the above and other objects in view, the invention resides in the novel construction, combination and arrangement of parts to be hereinafter specifically described and then claimed.

Reference will now be had to the drawing, wherein—

Figure 1 is a side elevation of a portion of the wheel partly broken away and partly in section; Fig. 2 is a cross sectional view of the same, and Fig. 3 is a plan of a portion of the felly of the wheel.

In the accompanying drawing the reference numeral 1 denotes a hollow hub constituting an air reservoir. The hub is made of light and durable metal and is provided with a plurality of radially disposed openings 2 having the walls thereof screwthreaded to receive nipples 3. The nipples 3 are also in screwthreaded engagement with collars 4 brazed or otherwise secured to the periphery of the hub and screwed into said collars and engaging the nipples 3 are tubular spokes 5. By adjusting the nipples 3 the position of the inner ends of the spokes 5 relative to the hub 1 can be determined prior to assembling the parts of the wheel. The inner ends of the spokes 5 are closed, with the exception of axial openings 6, and movable in said openings are the inner ends of piston rods 7. The rods 7 are provided with piston heads 8 and 9, the latter having packing rings 10. Encircling the inner ends of the piston rods 7, between the heads 9 and the closed ends of the spokes are coiled compression springs 11, said springs coöperating with the air in the hub reservoir in cushioning an inward movement of the piston rods.

The outer ends of the spokes 5 are reduced to provide annular shoulders 12, and seated upon the shoulders of said spokes is a metallic felly 13. The felly 13 is retained upon the ends of the spokes by nuts 14 screwed upon the reduced outer ends of said spokes, and the inner edge of the felly has an annular outwardly projecting flange 15, while the outer edge of the felly has an inwardly projecting annular flange 16. Detachably connected to the inwardly projecting flange 16 by screw bolts 17, nuts 18 or other fastening means, is a flat retaining ring 19 that coöperates with the annular outwardly projecting flange 15 in providing a channel upon the periphery of the wheel.

The piston heads 8 protrude from the outer ends of the tubular spokes 5 and are provided with segment shoes 20 supporting a solid tire 21. The tire 21 is made of hard rubber or a suitable material and is retained upon the shoes 20 by the flange 15 and the retaining ring 19. Encircling the piston head 8, between the shoes 20 and the outer ends of the tubular spokes 5, are coiled compression springs 22 coöperating with the springs 11 in cushioning the shoes 20.

The hollow hub 1 is provided with a conventional form of air inlet connection or valve 23, whereby air can be pumped into the reservoir formed by the hollow hub. Air under pressure within the hollow hub cushions an inward movement of the piston head 9 and should for any reason the air fail to serve its purpose, the springs 11 and 22 accomplish practically the same purpose.

It is thought that the utility of the wheel will be apparent without further description, and while in the drawings there is illustrated a preferred embodiment of our invention, it is to be understood that the structural elements are susceptible to such changes, as in the size, shape and manner of assemblage as fall within the scope of the appended claim.

What we claim is:—

In a vehicle wheel, a hollow hub constituting an air reservoir, tubular spokes in communication with said hollow hub and having the outer ends provided with shoulders and screwthreaded and the inner ends thereof partially closed, a felly connecting the outer ends of said spokes and seated on the shoulders thereof, nuts screwed on the outer ends of said spokes against said felly, flanges at the edges of said felly, a retaining ring detachably connected to one of said flanges in coöperating with the other flange in providing a peripheral channel, piston rods movable in said spokes, piston heads carried by each piston rod, shoes at the outer ends of said piston rods, a tire upon said shoes in the peripheral channel of said wheel, and a compression spring between one of said piston heads and the partially closed end of each spoke, and a compression spring encircling the other piston head between the shoe and the nut of each spoke, said springs coöperating with said piston heads in cushioning said shoes.

In testimony whereof we affix our signatures in the presence of two witnesses.

HECTOR V. PANNECOUCKE.
HUGO SCHAEFER.

Witnesses:
ANNA M. DORR,
KARL H. BUTLER.